United States Patent [19]

Adell

[11] Patent Number: 4,697,327

[45] Date of Patent: Oct. 6, 1987

[54] PAINTED INSULATED METAL EDGE GUARD AND METHOD

[75] Inventor: Robert Adell, Sunnyvale, Tex.

[73] Assignee: U.S. Product Development Company, Sunnyvale, Tex.

[21] Appl. No.: 839,744

[22] Filed: Mar. 13, 1986

[51] Int. Cl.$^4$ .............................................. B23P 17/04
[52] U.S. Cl. ..................... 29/527.4; 49/462; 264/171
[58] Field of Search ............. 29/527.4, 527.2, 527.1; 49/462; 264/171

[56] References Cited

U.S. PATENT DOCUMENTS

| | | | |
|---|---|---|---|
| 3,167,856 | 2/1965 | Zoller | 29/527.1 |
| 3,222,769 | 12/1965 | Le Plae | 29/527.1 |
| 3,371,447 | 3/1968 | Ruff et al. | 29/527.1 |
| 3,470,598 | 10/1969 | Berthelsen | 29/527.1 |
| 4,094,056 | 6/1978 | Takeda et al. | 29/527.2 |
| 4,259,812 | 4/1981 | Adell | 49/462 |
| 4,316,348 | 2/1982 | Adell | 49/462 |
| 4,334,700 | 6/1982 | Adell | 49/462 |
| 4,338,148 | 7/1982 | Adell | 49/462 |
| 4,365,450 | 12/1982 | Adell | 49/462 |
| 4,377,056 | 3/1983 | Adell | 49/462 |
| 4,379,376 | 4/1983 | Adell | 49/462 |
| 4,379,377 | 4/1983 | Adell | 49/462 |
| 4,387,125 | 6/1983 | Adell | 49/462 |
| 4,457,112 | 7/1984 | Adell | 49/462 |

Primary Examiner—Timothy V. Eley
Attorney, Agent, or Firm—Rhodes and Boller

[57] ABSTRACT

A process for making a painted insulated metal edge guard comprises extruding plastic insulating material onto a flat strip of metal as the strip is pulled through the extruder, painting the strip, coiling the painted insulated strip into coils, and uncoiling a coiled strip at the beginning of the roll-forming apparatus and feeding the insulated strip through the roll-forming apparatus to form an edge guard of a desired cross sectional shape wherein the plastic insulating material is so disposed as to insulate the metal of the edge guard from the edge of the object onto which it is installed and the paint provides at least a portion of the exterior appearance of the edge guard. The process improves the efficiency for manufacturing painted insulated metal edge guards and it permits various embodiments of new and unique edge guards to be efficiently created. The invention has special utility where a range of colored edge guards must be produced in varying quantities.

20 Claims, 14 Drawing Figures fig. 1 fig. 1a.

PAINTED INSULATED METAL EDGE GUARD AND METHOD

REFERENCE TO A RELATED APPLICATION

This application is in certain respects related to copending application Ser. No. 636,880, filed Aug. 2, 1984, now U.S. Pat. No. 4,578,858 issued Apr. 1, 1986.

BACKGROUND AND SUMMARY OF THE INVENTION

This invention relates to insulated metal edge guards of the type which are applied to the trailing edges of swinging closures, such as an automobile's doors. More specifically the invention relates to a new method of making such edge guards and the edge guards produced by the method.

Edge guards of the general type to which the present invention relates are disclosed in a number of applicant's issued U.S. patents such as

| | | |
|---|---|---|
| 4,259,812 | 4,338,148 | 4,379,376 |
| 4,316,348 | 4,365,450 | 4,379,377 |
| 4,334,700 | 4,377,056 | 4,387,125 |

There are also other patents and a number of applicant's pending patent applications relating to this subject which are known to the Patent Office by virtue of their pendency.

A door edge guard provides a protective function preventing the door edge from damage when the door is swung open against an object in the path of travel of the swinging door. Without door edge guards the painted door edges are subject to chipping, marring, consequent adverse affects such as rusting and corrosion. This can lead to unsightly appearance and detract from the value of an automobile.

Applicant's inventions in insulated metal door edge guards serve to protectively insulate the metal of the edge guard channel from that of the door and in so doing minimize the possibility of electrochemical action occurring between the two metals, i.e. rusting. Applicant has also pointed out the advantages of having metal edge guards self-retaining.

Applicant has also developed edge guard designs in which the insulating material can be used to provide color coordination of the edge guard with the color of the swinging closure on which the edge guard is installed. For example in the case of a door edge guard, the exterior surface of the edge guard may be provided with a layer of insulating material of a desired color which coordinates with the color of the painted door.

Since automobile manufacturers offer a wide range of colors, and because such particular color-coordinated edge guard for a given door for a particular automobile model must be identified by its own unique part number even though all edge guards for that door would have the same shape, the provision of a range of color door edge guards for the automobile industry is a monumental taks.

The present invention provides a solution for efficiently performing this task.

One practice for manufacturing insulated metal edge guards comprises laminating a sheet of insulating material to a surface of a metal coil, slitting the coil into insulated strips of appropriate widths, and then roll-forming the slit insulated strips into U-shaped cross sections. With this procedure it is not possible for the insulating material to cover the side edges of the slit strip, and any covering of the side edges of the strip must be performed by a separate operation.

The availability of certain insulating materials, such as fluoridated vinyls, is only in sheets of certain minimum widths which are much larger than the widths of the individual strips which are formed into the U-shaped cross sections to form the insulated edge guards. Because the mix of color-coordinated edge guards will not be uniform, this procedure will contribute to costs associated with providing a range of color-coordinated insulated edge guards because it is necessary for the edge guard manufacturer to make certain minimum purchases from the manufacturer of the plastic material, and in widths greater than that of the metal strip forming the edge guard. Hence where a particular color may have only small usage, the edge guard manufacturer must carry a substantial inventory of that color and as can be appreciated some of this inventory may never be used, and the attendant costs constitute a waste of resources.

With the present invention the cost associated with providing such a range of edge guards are reduced to the advantage of the edge guard manufacturer, the automobile company, and the consumer who purchases an edge-guard-equipped automobile.

It has also been proposed to roll-form a metal strip of the appropriate width into a U-shaped cross section for the edge guard channel and then to run the U-shaped channel through an extruder to extrude plastic installation onto the formed U-shaped cross section. This procedure is satisfactory in the case of an edge guard when the U-shaped channel has been roll-formed into a straight shape. However where the edge guard must have a sweep so as to allow it to fit onto the trailing edge of a swinging closure which has a sweep, such as is often the case with an automobile door, it means that such sweep must be imparted by an additional operation after the plastic has been extruded onto the straight U-shaped cross section. Moreover, where multiple colors are involved the process becomes even more complicated.

The present invention improves the efficiency of manufacturing insulated metal edge guards, in general. It also especially improves the cost effectiveness of the production of insulated metal edge guards which are provided in a range of various colors for color coordination with a range of different automobile colors. The invention yields a very attractive and functional product of high quality. The inventory requirements for stocking bulk material in different colors are considerably simplified so that inventory costs are reduced.

Briefly the preferred embodiment of the present invention comprises a process wherein plastic material is extruded onto a flat strip of metal which has a width corresponding to that which is to be used in roll-forming of an edge guard. The metal strip is pulled through an extruder in a straight line, and the plastic insulation is applied to the metal strip in an appropriate configuration. Paint is then applied to the strip in an appropriate configuration. The strip is then wound into coils while still in the flat, and then the coils are unwound at a roll-former which roll forms the flat insulated strip into the desired U-shaped cross section. The preferred embodiment of the resulting edge guard product has the non-metallic insulating material (i.e. plastic) protectively insulating the metal of the edge guard channel from the edge of the object on which the edge guard is to be installed. The paint provides a desired exterior coloration for visual effect.

The invention also provides the opportunity for creating unique edge guard constructions endowed with various decorative and functional features. The cross section of the metal strip may be completely encapsulated with plastic, and the paint selectively applied to the plastic. By a selective extrusion of insulated plastic materials onto the metal it is possible to impart particular designs onto the metal by leaving selected portions of the metal uncovered. It is possible to apply material such as paint or plastic to these voids, and for example a second extruder may be associated with the process to extrude material into the void which is left in a previously applied extrusion. By way of example a material which fills a void may have a light-reflective characteristic whereby a band of light-reflective material may appear in the edge guard so as to provide a light-reflective character useful at night.

Different color contrasts may be imparted to the metal channel of the edge guard while the protective and functional aspects of the edge guard are retained.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
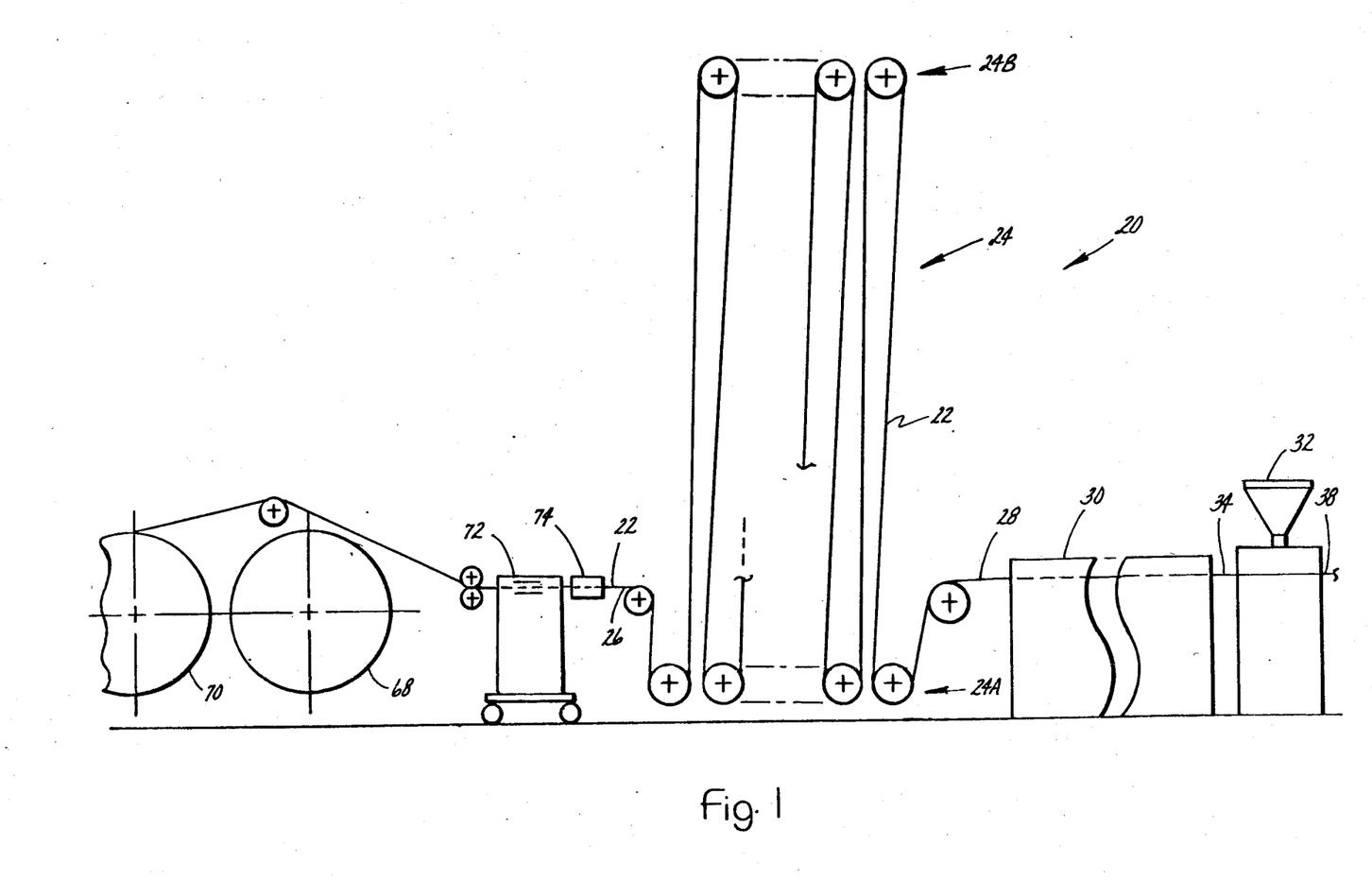
FIGS. 1 and 1A should be considered together and illustrate in front elevation apparatus for performing a part of the process of the present invention.
Figure 1A:
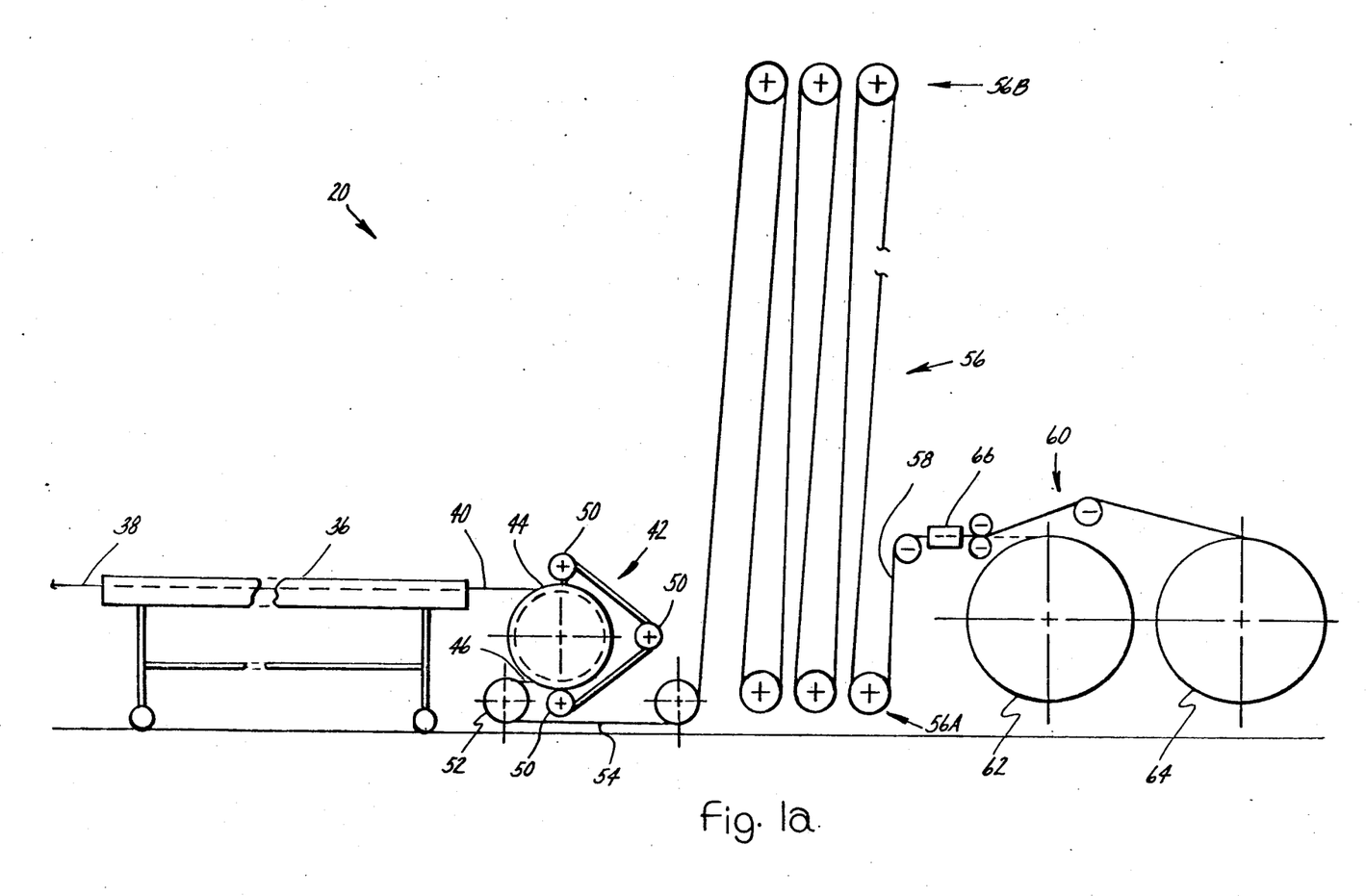

FIGS. 1 and 1A illustrate an apparatus 20 for performing part of the process of the present invention in making a painted insulated metal edge guard. The direction of work flow in each of FIGS. 1 and 1A is from left to right with the left hand end of FIG. 1A representing a continuation from the right hand end of FIG. 1.

As shown in FIG. 1, a metal strip 22 is introduced into a set of accumulating rolls 24 at the location indicated by the arrow 26. The strip 22 passes up and down through the rolls of set 24 in the manner shown, and it exits the set 24 at the location indicated by the arrow 28.

From point 28 the metal strip is conducted through conditioning procedures designated by the reference numeral 30 to condition the metal for subsequent application of insulating material by an extruder 32. The transition from the conditioning apparatus 30 to extruder 32 is indicated by the reference numeral 34.

Extruder 32 operates to extrude plastic insulating material onto the conditioned metal strip 22 in an appropriate configuration. The particular configuration will depend upon the requirements for the finished edge guard, and as will be seen in the ensuing description, various embodiments for configurations of plastic are shown along with the resultant edge guard constructions. As the metal strip passes through extruder 32 it remains in the flat, and it is pulled in a straight line through the extruder.

From extruder 32 the metal strip 22, which now contains plastic insulating material of an appropriate configuration, passes through a water trough 36 with the point of transition from the extruder to the water trough being indicated by the reference numeral 38. The water trough serves to cool the plastic material to a suitable temperature.

The insulated metal strip leaves water trough 36 to pass through a paint applying station 40 where paint is continuously applied to the travelling strip in a desired selected manner. A power driven mechanism 42 is located at the exit from paint station 40 and is operable to pull the strip through the line. Mechanism 42 comprises a drum 44 arranged tangentially to the straight strip as it leaves the paint station with the strip extending half way around the drum to exit at the location identified by the reference numeral 46. A flexible drive belt 48 cooperatively associated with a set of wheels 50 is arranged to bear against the insulated strip as it extends semi-circumferentially around drum 44.

From point 46 the strip passes around a roll 52 and extends along the location 54 to a set of accumulating rolls 56 where the insulated strip is conducted up and down over a series of individual rolls in the manner shown. The strip exits the set of rolls 56 at the location indicated by the reference numeral 58 to coiling apparatus designated by the general reference numeral 60.

Coiling apparatus 60 is shown to comprise two spaced apart winding reels 62 and 64 onto which the strip is wound after it has passed through the line. The provision of the two separate reels 62 and 64, along with an associated clamp 66 just ahead of the two reels, permits the extrusion and painting process to run continuously after a full coil of painted insulated metal strip has been wound on one of the two reels.

When one of the reels has been wound full, or to any other desired amount, clamp 66 is actuated to clamp the strip. The strip is cut between the clamp and the completed coil, and during the time that the strip is clamped the accumulating rolls are operable to accumulate the continuously advancing strip as it passes through extruder 32 and paint station 40. For this purpose the set of rolls 56 comprises a lower series 56A and an upper series 56B which are displaceable toward and away from each other and serve to accumulate material by displacing the two series of rolls further apart.

The cut end of the strip which extends from clamp 66 can be conducted onto the empty reel, such as by operator intervention, with the clamp being under the control of the operator to allow him to pull the end of the strip from the clamp and onto the new reel. Upon threading of the new reel from the end of the strip extending from the clamp, the clamp can be released and the reel operates to begin accumulating convolutions of the metal strip to form a new coil. While the new coil is being wound the completed coil is removed from the other reel so that it will be available for use when the coil presently being wound is finished. During the time that the new coil is being wound, the two series of rolls 56A and 56B are moved close together so as to be prepared for accumulation of insulated strip material at the next reel change-over.

In this way the process can be continuously conducted while individual coils of insulated strip are made.

It will also be observed at the beginning of the line that provision is made for starting new bare metal coils into the line without the need to interrupt the flow of the strip through the line. In this regard the apparatus includes a pair of reels 68 and 70 at the beginning of the line. There are also a welder 72 and a clamp 74 which are associated with the reels 68 and 70 at the entrance to the set of rolls 24. Coils of metal strip of the appropriate width to be subsequently roll-formed in making the edge guards are on the reels 68 and 70. One of these coils is being unwound and pulled through the welder, clamp and the remainder of the line in FIGS. 1 and 1A. When that particular coil has been almost fully used up, clamp 74 is operated to clamp the bare metal strip. At this time two series of rolls 24A and 24B, which are analogous to the two series 56A, 56B of set 56, will be a large distance apart so as to have accumulated an appreciable length of metal strip between the individual rolls. This provides an accumulated supply which can continue to be pulled through the line while clamp 74 remains clamped. A fresh coil of metal strip from the other reel is introduced into the welder to butt the end of the strip which has just been pulled off the first reel. Welder 72 is operated to weld the two together. When clamp 74 is released, metal from the fresh coil is pulled from that reel and passes through the line. During the time that the new reel is being used, another new coil is placed on the vacant reel. Also during this time the set of rolls 24 operates to accumulate length of strip so that a sufficient amount will be available during the next change of coils.

In this way it is possible for the extrusion and painting process to be continuously operated while new coils of metal strip are introduced at the beginning of the line and, as explained earlier, insulated coils are removed at the end of the line.

Figure 2:
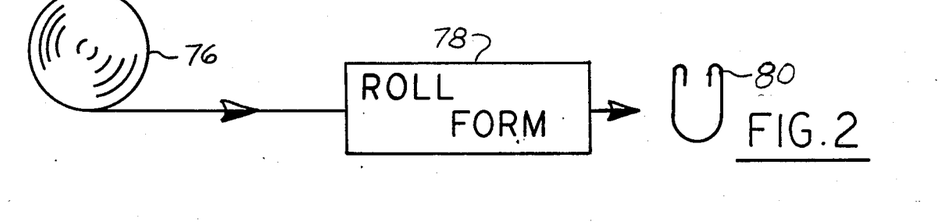
FIG. 2 is a view representing a continuation of the process from FIGS. 1 and 1A.

A coil of painted insulated metal strip is then processed by a roll-forming apparatus as shown in FIG. 2. The coil is designated by the reference numeral 76 and the roll-forming apparatus by the reference numeral 78. The roll-forming apparatus is conventional and comprises a series of rolls arranged to form the insulated metal strip into a desired U-shaped cross section such as depicted by the reference numeral 80 in FIG. 2 as an example. It will be observed that the insulated metal strip is wound in the flat to form the coil 76 and it is the flat painted insulated metal strip which is fed into the roll-forming apparatus. Accumulation of the coils of flat metal strip is more advantageous than accumulating coils in cross sections other than flat ones.

Figure 5:
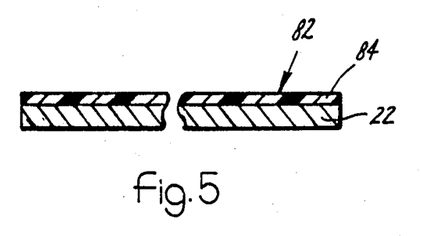
FIG. 5 is a transverse cross section through one embodiment of insulated metal strip according to the present invention at the stage of the process depicted by lines 5—5 in FIG. 1A.

FIG. 5 illustrates a first exemplary embodiment 82 of insulated metal strip after exiting the water trough 36 in FIG. 1A. This embodiment 82 comprises the cross section of metal strip 22 having been fully encapsulated by an insulating layer of plastic designated by the reference numeral 84. Any extrudable material of suitable characteristics may be used for the layer 84, and polyvinylchloride (i.e. vinyl, or PVC) has been found particularly suitable. While the dimensions of the strip and insulating material are shown to be rectangular in cross section, it is to be appreciated that other dimensions and proportions may be used depending upon the particular requirements for any given door edge guard. Typically, a uniform thickness for the insulating layer is on the order of several mils, so that in effect the insulating layer constitutes a film of material. It may however be thicker, and the important thing in general is to be sure that it forms an insulating layer between the metal of strip 22 and the edge of the object on which the finished edge guard product is installed.

Figure 6:
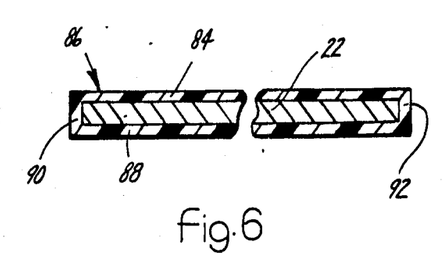
FIG. 6 is a view like FIG. 5 but taken at 6—6 in FIG. 1A.

FIG. 6 illustrates the condition of the insulated metal strip of FIG. 5 after having passed through painting station 40. In this particular embodiment a layer of paint 86 has been applied to one of the two major surfaces of the insulated metal strip. In other words paint has not been applied to the side edge surface or to the surface directly opposite the painted surface.

Because the painted insulated metal strip will be subsequently formed into an elongate channel shaped member, it is important for the paint to be of a formulation which is conducive to such formation. Examples of certain paints which may be useful in this regard are urethane paints, elastomer paints, and latex paints.

An advantageous aspect of the invention is that the condition of the insulated metal strip prior to entering the painting station 40 may be used to promote quick paint drying. This is because the insulated metal strip, as it leaves the extruder, will be comparatively hot. In general the temperature may be too hot for the immediate application of paint and therefore passing of the insulated metal strip through the water trough prior to the painting station 40 is believed appropriate in most instances to bring the temperature to a suitable state for painting. However it is contemplated that certain paints might be able to be applied to the insulated strip material leaving the extruder without having to pass through a water bath, or other equivalent medium, for reducing temperature. As the strip enters painting station 40 it will be at a sufficiently elevated temperature that its heat energy will be useful in promoting quick drying of the paint. The painting station may include an additional heat input to assist in paint drying. The application of paint to the insulated metal strip may be conducted by any suitable means but in general spraying will probably be most widely used.

In any given process line constructed in accordance with principles of the invention there may be variations in specific processing requirements in view of particular materials utilized in the fabrication of the painted insulated metal, and the specifically described embodiment is representative.

It is also to be appreciated that the drawing figures are of a somewhat schematic nature and are not necessarily intended to represent proportional spacing distance between points at which various operations are conducted along the process line. Thus for example if the paint were to be allowed to dry simply by the heat of the metal strip and exposure to air, there might be a considerable length of line where the strip simply passes through air without any particular operations being conducted. In other words a sufficient length of line may be devoted simply to the ambient air drying of the paint. In this regard the use of fast drying paints is also advantageous.

Another one of the special attributes of the invention relates to efficiently and economically fulfilling requirements for a range of various door edge guard colors for color coordination with a range of automobile paint colors. Depending upon exactly what cross sectional shape the painted insulated metal strip is formed into and depending upon the manner in which the plastic insulation and paint are applied to the metal strip, either one or both of the plastic insulation and the paint may present exterior colored appearance to the resulting edge guard product.

Figure 10:
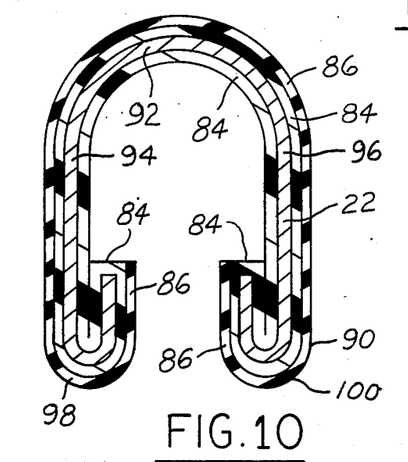
FIG. 10 is a transverse cross sectional view through an edge guard which has been formed from the embodiment of FIG. 6.

FIG. 10 illustrates a possible cross sectional shape for an edge guard 90 formed from the embodiment of FIG. 6. Edge guard 90 is formed to the illustrated cross sectional shape by the roll-forming apparatus and procedure described with reference to FIG. 2. The embodiment 90 is of a generally U-shaped cross section having a generally semi-circular base 92 from which extend inner and outer legs 94, 96. The side margins of the painted insulated strip are reversed turned back against the inside of the legs to form beads 98, 100 respectively at the distal ends of the legs 94, 96 respectively. The illustrated cross sectional shape is so formed that the layer of paint 86 presents the exterior appearance of the edge guard when the edge guard is installed on an edge. Because the entirety of the edge guard cross section is covered with insulating material, the metal channel is insulated from the edge of the object on which the edge guard is installed. The edge guard is preferably self-retaining so that when installed on an edge, such as the trailing edge of an automobile door, the beaded distal ends of the legs exert the self-retention force.

One of the special attributes of the invention relates to an improvement for efficiently and economically fulfilling requirements for a range of various edge guard colors for color coordination with a range of automobile paint colors. Where there is to be a change of color for the edge guard it is possible to keep the line of FIGS. 1 and 1A running while changing color by switching colors of paint. This can be done by connecting the painting station dispensing mechanism such as the sprayer to a different color paint supply. Alternatively, there could be different sprayers within the painting station which are switched on and off depending upon which particular color is to be applied. In this way the line can continuously operate and as the material comes off the set of accumulator rolls 56, an operator can watch for a color change and cut the material at the appropriate point. This is an efficient way to keep the line running while performing a color change with a minimum production of scrap material.

The present invention provides the capability for reducing inventory requirement since all that need be inventoried are different colored paints. In other words, a standard insulation can be used, and different color coordination schemes for the embodiment of FIG. 10 achieved simply by a change in paint color. This is distinguished from other procedures involving colored plastic material since a stocking of various different colored plastic materials would be unnecessary for making the embodiment of FIG. 10. When a color is to be changed, all that is necessary is to change the paint which is used at painting station 40.

Figure 4:
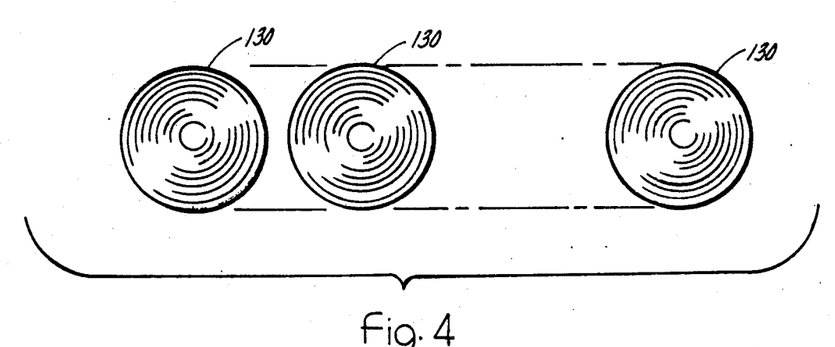
FIG. 4 is a view of the product produced by the method during a stage of the method.

Another advantage of the invention is that a single line such as that shown in FIGS. 1 and 1A can serve multiple roll-forming lines. Roll-forming lines typically run slower than the line of FIGS. 1 and 1A, and therefore the invention provides a further economy and operating efficiency. Numerous versatilities of use are also an attribute of the invention. Coils of painted insulated metal strip are accumulated in storage for subsequent use by roll-formers in accordance with particular production requirements for different colored edge guards. FIG. 4 shows a series of coils 130 having different colors.

The efficiency of operation is particularly advantageous where an edge guard is required to have a sweep corresponding to the contour of a particular door edge on which it is to be installed. For example, applicant's U.S. Pat. No. 4,457,112 shows an edge guard which possesses sweep. By extruding plastic material onto the flat metal strip and by painting the strip before roll-forming, sweep can subsequently be imparted during the roll-forming procedure, if desired. If the material were to be extruded and painted onto an already formed U-shaped cross section of metal, which is more difficult than extruding and painting in the flat, a requirement for sweep in the finished edge guard product would involve an additional operation because extrusion and painting onto a U-shaped part which already has sweep will be even more difficult. With the present invention difficulties such as these are avoided.

Figures 7, 8, 9:
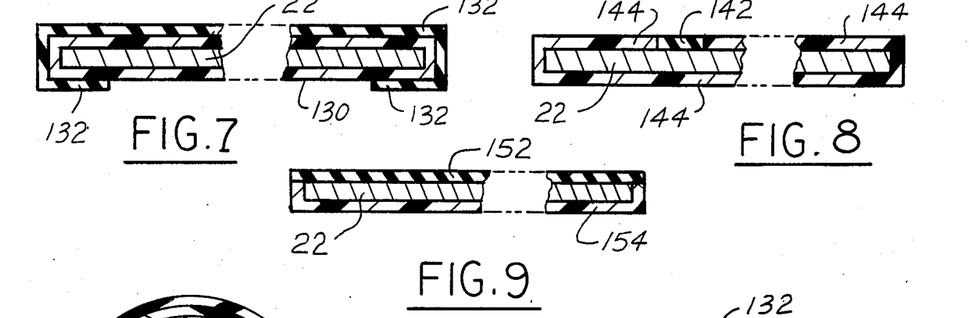
FIG. 7 is a transverse cross sectional view, similar to FIG. 6, through another embodiment.
FIG. 8 is a transverse cross sectional view, similar to FIG. 6, through a third embodiment.
FIG. 9 is a transverse cross sectional view, similar to FIG. 6, through a fourth embodiment.
Figure 11:
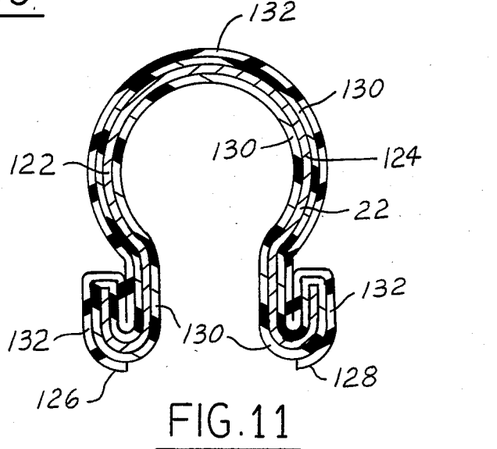
FIG. 11 is a transverse cross sectional view through an edge guard which has been formed from the embodiment of FIG. 7.

FIG. 7 illustrates a further embodiment of painted insulated strip in which paint covers the full extent of one major surface of the insulated strip, both side edge surfaces, and margins of the opposite major surface. FIG. 11 illustrates a resulting door edge guard product 120 formed from the painted insulated strip of FIG. 7. This embodiment 120 is of a general U-shaped cross section having inner and outer legs 122, 124 with beads 126, 128 at the ends. The beads are formed by reverse turning the side margins of the strip against the outside of the respective legs. Also the legs have curved offsets so that the exterior of the legs presents a substantially flush appearance. Because the entirety of the cross section of metal 22 is covered with plastic insulating material 130 there is full assurance that the metal channel is insulated from the metal of the edge on the obJect onto which the edge guard is installed. By applying the paint 132, on one major surface, on the side edge surfaces and on the adjacent margins of the opposite major surface, formation of the beads by reverse turning still results in the color of the paint presenting the entire exterior appearance. Because an edge guard product is typically cut to length, the cut ends may expose edges of the metal. If desired, they can be covered with paint or another medium.

Figure 12:
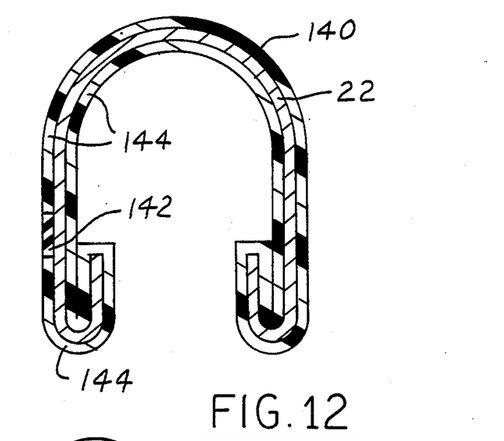
FIG. 12 is a transverse cross sectional view through an edge guard fabricated from the embodiment of FIG. 8.

FIG. 8 illustrates a further embodiment in which the plastic insulating material covers the full extent of one major surface, the side edge surfaces but only a portion of the opposite major surface. Paint may be sprayed directly onto the metal 22 where it is not covered by the plastic insulation. A resulting edge guard product 140 formed from the example of FIG. 8 is illustrated in FIG. 12. It shows the painted area 142 to be disposed on the exterior surface of the inner leg. By using a light-reflective type of paint, the edge guard product is endowed with a night-time feature whereby when the door is opened and struck by incident light from the rear, such as a rear vehicle's headlight, the light-reflective paint will reflect back in the direction of incident light.

The edge guard 140 of FIG. 12 is shown formed into a cross sectional shape like that in FIG. 10. As such the plastic 144 presents the entire exterior appearance except for the painted light-reflective band 142. The metal channel is insulated from the edge of the door. The color of the insulating material presents the predominant exterior appearance except for the painted band 142.

Figure 13:
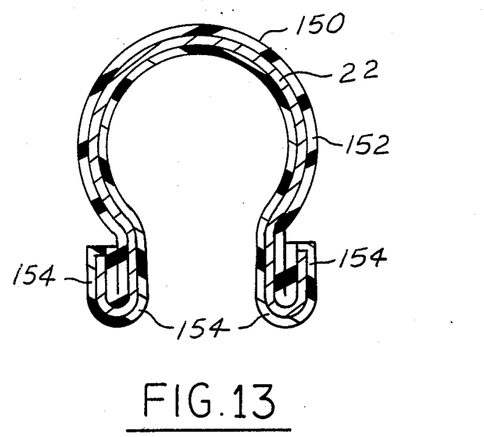
FIG. 13 is a transverse cross sectional view through an edge guard fabricated from the embodiment of FIG. 9.

FIG. 9 illustrates yet another embodiment in which insulating material is applied to the entire cross section of metal strip except for the full extent of one of the major surfaces. Paint is applied directly to this one major surface. The resulting edge guard product 150 is formed to a cross sectional shape shown by FIG. 13. In this embodiment the reverse turning to form the beads will cause the resultant edge guard product to have an exterior appearance which comprises the color of the paint 152 for the most part but with bands of insulating material 154 at the distal ends of the exteriors of legs. Depending upon particular colors of the vinyl insulating material and of the paint, various color coordination schemes may result. In this embodiment the metal channel continues to be insulated from the door edge.

It is to be appreciated that numerous other specific embodiments of edge guards may be fabricated in accordance with principles of the invention. In some the exterior appearance will be the combined effect of paint and plastic. In others it may be the result of paint alone. Paint may be applied to plastic alone, to metal alone, and/or to overlap both plastic and metallic areas where less than the full extent of the cross section of the metal strip is covered by plastic.

Figure 3:
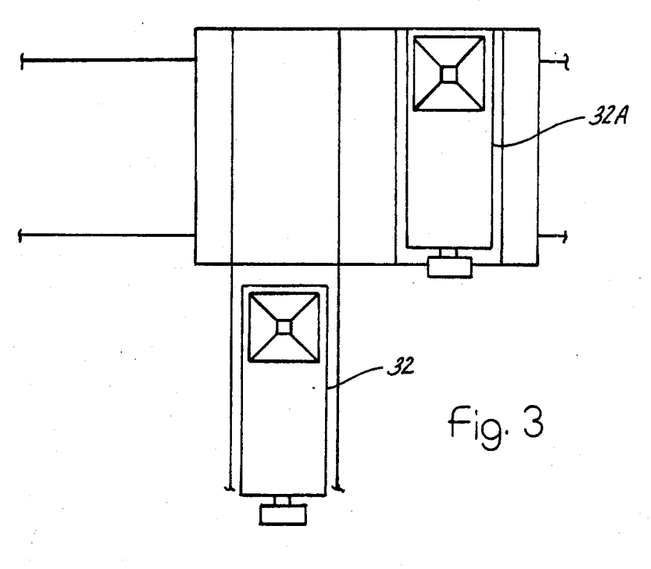
FIG. 3 is a top plan view of a portion of FIG. 1 illustrating a modification.

In view of the foregoing description, it will be appreciated that in certain embodiments of edge guards, the exterior color presented will be determined at least in part by the plastic material. Thus it may be necessary to utilize various colors of plastic insulating material and when a color change is necessary to perform the color change in an analogous manner to the color change in paint. In order to realize the special attribute of efficiently and economically fulfilling the requirement for a range of various door edge guard colors for color coordination with a range of automobile paint colors, the line can be kept running while changing from one color of plastic to another. For this, reference is made to FIG. 3 which shows plural extruders 32 with one extruder 32A being on-line and the other extruder 32B being off-line. The on-line extruder can apply one particular color and then when a different color is to be applied it can be moved off-line and the other extruder containing the different color placed on-line. The changeover will be effective to cause a color change in insulating material being applied to the metal strip passing through the extruder. The on-line extruder will operate continuously so long as new raw plastic feed stock is fed into the hopper. A change in color of plastic insulating material may or may not be coordinated with the change in paint color depending upon particular requirements.

Where a color change is due to a change in color of plastic and this color change will have a bearing on the finished edge guard product, an operator can watch the material coming off the set of accumulator rolls 56 for color change and cut the material at the appropriate point. Co-extrusion can also be performed on the metal strip. For example, one extruder can extrude plastic onto a given area of the strip and another onto another area. The areas may be discrete or overlapping. Subsequently paint may be selectively applied as desired.

In some embodiments the plastic can be clear vinyl, and in others it can be a metallic color closely matching the metal. Of course there are many other colors which are possible as well. While the paint is intended to perform principally a decorative function, it can also provide a protective function. Like the plastic the paint can be any of numerous colors. It is to be appreciated that in the drawing figures the relative proportions may not necessarily be to scale or represent exact proportions since they are intended to be illustrative to principles of the invention.

The invention has been shown to provide an advantageous, efficient and versatile improvement. The invention relates both to the process and features in the resultant edge guards constructions. While a preferred embodiment of the invention has been disclosed it will be appreciated that principles are applicable to other embodiments.

What is claimed is:

1. A process for making a decorative and protective painted insulated metal edge guard of generally U-shaped cross section which fits onto the trailing edge of a swinging closure wherein at least a portion of the exterior surface of the U-shaped cross section which is visible when the edge guard is installed on the trailing edge of the swinging closure is covered by material which is color coordinated with the color of the swinging closure, said process comprising extruding by means of an extruder a layer of a non-metallic insulating material onto a metal strip which is pulled through the extruder along a straight line, painting the strip selectively one color after another, then after the strip has been pulled through the extruder and painted, forming the now-painted and now-insulated strip into a succession of individual coils, each of which has been painted with a paritcular color, by coiling the strip after it has been pulled through the extruder and painted, and severing the strip between different paint colors, then taking one of said coils containing painted insualted strip of desired paint color for color-coordination with a particular colored swinging closure, uncoiling the strip from said one coil and passing the uncoiled strip through a roll-forming apparatus to form the painted insulated strip into a U-shaped cross section for fitting onto the trailing edge of the swinging closure and wherein the exutrder so extrudes the layer of insulating material onto the metal strip and the roll-forming apparatus so forms the strip into the U-shaped cross section that at least some of said insulating material is disposed on the interior of the strip so as to protectively insulate the metal of the strip from the the trailing edge of the swinging closure when the edge guard is installed on the trailing edge of the swinging closure, and that at least some of the paint is disposed on the exterior of the strip so as to be visible when the guard is installed on the trailing edge of the swinging closure.

2. A process as set forth in claim 1 in which the layer of non-metallic insulating material is extruded by the extruder onto the entire exterior surface of the metal strip as viewed in transverse cross section through the strip, and the painting of the strip is conducted after the extrusion step with the paint being selectively applied to a selected portion of the non-metallic insulating material.

3. A process as set forth in claim 2 in which the paint is applied to fully cover one major surface of the insulated strip, and the painted insulated strip is so formed that said one major surface forms most of the exterior of the edge guard.

4. A painted insulated edge guard made by the method of claim 3.

5. A process as set forth in claim 2 in which the paint is applied to fully cover one major surface of the insulated strip, to fully cover the side edge surfaces of the insulated strip and immediately adjacent margins of the other major surface of the insulated strip, thereby leaving a zone of unpainted insulating material between the painted margins of said other major surface of the insulated strip and wherein the painted insulated strip is processed by the roll-forming apparatus so that the exterior of the edge guard comprises only paint.

6. A process as set forth in claim 5 including the step of forming beads at the distal ends of legs of the edge guard by outwardly reverse turning the margins of the strip such that the paint which is applied to said margins of said other major surface of the insulated strip are disposed on the exterior of the edge guard while the unpainted portion forms the interior of the edge guard.

7. A painted insulated edge guard made by the method of claim 6.

8. A painted insulated edge guard made by the method of claim 5.

9. A painted insulated edge guard made by the method of claim 2.

10. A process as set forth in claim 1 in which the non-metallic insulating material is applied to a limited portion of the exterior surface of the metal strip as viewed in transverse cross section through the strip and paint is applied to at least a portion of the metal strip which is free of said non-metallic insulating material.

11. A process as set forth in claim 10 in which said non-metallic insulating material is applied to one major surface of the metal strip and both side edge surfaces leaving the other major surface of the metal strip bare after the extrusion step and wherein paint is applied to the full extent of said other major surface.

12. A painted insulated edge guard made by the method of claim 11.

13. A painted insulated edge guard made by the method of claim 10.

14. A painted insulated edge guard made by the method of claim 1.

15. A process for making a decorative and protective painted insulated metal molding of generally channel-shaped cross section which fits onto an object wherein at least a portion of the exterior surface of the channel-shaped cross section which is visible when the molding is installed on the object is covered by material which is color-coordinated with the color of the object, said process comprising extruding by means of an extruder a layer of a non-metallic insulating material onto a metal strip which is pulled through the extruder along a straight line, painting the strip selectively one color after another, then after the strip has been pulled through the extruder and painted, forming the now-painted and now-insulated strip into a succession of individual coils, each of which has been painted with a particular color, by coiling the strip after it has been pulled through the extruder and painted, and severing the strip between different paint colors, then taking one of said coils containing painted insulated strip of a desired paint color for color-coordination with a particular colored object, uncoiling the strip form said one coil and passing the uncoiled strip through a roll-forming apparatus to form the painted insulated strip into a channel-shaped cross section for fitting onto the object wherein the extruder so extrudes the layer of insulating material onto the metal strip and the roll-forming apparatus so forms the strip into the U-shaped cross section that at least some of said insulating material is disposed on the interior of the strip so as to protectively insulate the metal of the strip from the object when the molding is installed on the object, and that at least some of the paint is disposed on the exterior of the strip so as to be visible when the molding is installed on the object.

16. A process set forth in claim 15 in which the layer of non-metallic insulating material is extruded by the extruder onto the entire exterior surface of the metal strip as viewed in transverse cross section through the strip, and the step of painting the strip is conducted after the extrusion step with the paint being selectively applied to the non-metallic insulating.

17. A painted insulated molding made by the method of claim 16.

18. A process as set forth in claim 15 in which the non-metallic insulating material is extruded by the extruder onto a limited portion of the exterior surface of the metal strip as viewed in transverse cross section through the strip and paint is applied to at least a portion of the portion of the metal strip which is free of said insulating material.

19. A painted insulatd molding made by the method of claim 18.

20. A painted insulated molding made by the method of claim 15.

* * * * *